(12) United States Patent
Shiraishi

(10) Patent No.: US 7,573,509 B2
(45) Date of Patent: Aug. 11, 2009

(54) DIGITAL STILL CAMERA, REPRODUCTION DEVICE, AND IMAGE PROCESSOR

(75) Inventor: Kenji Shiraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 830 days.

(21) Appl. No.: 10/354,193

(22) Filed: Jan. 30, 2003

(65) Prior Publication Data

US 2003/0147000 A1 Aug. 7, 2003

(30) Foreign Application Priority Data

Jan. 30, 2002 (JP) ............................. 2002-021278
Mar. 11, 2002 (JP) ............................. 2002-065261

(51) Int. Cl.
*H04N 5/76* (2006.01)
*H04N 5/235* (2006.01)

(52) U.S. Cl. .................................. 348/231.2; 348/362

(58) Field of Classification Search ............. 348/231.2, 348/231.5, 231.6, 231.9, 221.1
See application file for complete search history.

(56) References Cited

U.S. PATENT DOCUMENTS

| | | | |
|---|---|---|---|
| 5,168,303 A | | 12/1992 | Ikenoue et al. |
| 5,818,977 A | * | 10/1998 | Tansley ...................... 382/294 |
| 5,899,581 A | * | 5/1999 | Kawamura et al. ........... 386/120 |
| 6,177,958 B1 | * | 1/2001 | Anderson .................... 348/362 |
| 7,002,625 B2 | * | 2/2006 | Takahashi ................. 348/231.2 |
| 7,030,914 B2 | * | 4/2006 | Yamagami ................ 348/231.2 |
| 7,046,275 B1 | * | 5/2006 | Yamada et al. ............ 348/220.1 |
| 2001/0030694 A1 | * | 10/2001 | Abe ............................. 348/223 |
| 2003/0147000 A1 | | 8/2003 | Shiraishi |

FOREIGN PATENT DOCUMENTS

| | | |
|---|---|---|
| JP | 3-153232 | 7/1991 |
| JP | 6-233225 | 8/1994 |
| JP | 7-191400 | 7/1995 |
| JP | 8-140025 | 5/1996 |
| JP | 2000-59725 | 2/2000 |
| JP | 2000-324430 | 11/2000 |
| JP | 2001-24928 | 1/2001 |
| JP | 2001-203934 | 7/2001 |
| JP | 2001-218077 | 8/2001 |
| JP | 2001-285779 | 10/2001 |

OTHER PUBLICATIONS

U.S. Appl. No. 10/354,193, filed Jan. 30, 2003, Shiraishi.
U.S. Appl. No. 10/636,712, filed Aug. 8, 2003, Shinohara et al.
U.S. Appl. No. 10/637,502, filed Aug. 11, 2003, Shiraishi.
U.S. Appl. No. 10/764,438, filed Jan. 27, 2004, Shiraishi et al.
U.S. Appl. No. 10/914,196, filed Aug. 10, 2004, Shiraishi.

* cited by examiner

*Primary Examiner*—David L Ometz
*Assistant Examiner*—Luong T Nguyen
(74) *Attorney, Agent, or Firm*—Oblon, Spivak, McClelland, Maier & Neustadt, P.C.

(57) ABSTRACT

A digital still camera for facilitating selection of a result as most intended by a photographer from among one set of photographed image data photographed in autobracket (AB) photographing, including a reproduction device which reproduces an image to reflect the photographer's intention. When recording in a memory card one set of photographed image data photographed in the AB photographing mode, a microcomputer renders the image data photographed in the AB photographing mode distinguishable, while linking the one set of the photographed image data as a series of image data to render the link distinguishable.

7 Claims, 3 Drawing Sheets

FIG. 2

- RIMG0001.JPG
- RIMG0002.JPG
- W0110003.JPG
- W0120004.JPG
- W0130005.JPG
- W0210006.JPG
- W0220007.JPG
- W0230008.JPG
- S0110009.JPG
- S0120010.JPG
- S0130011.JPG
- RIMG0012.JPG

DIGITAL STILL CAMERA, REPRODUCTION DEVICE, AND IMAGE PROCESSOR

BACKGROUND OF THE INVENTION

1. Field of the Invention

The present invention relates to a digital still camera, a reproduction device, and an image processor. In detail, the present invention relates to a digital still camera for performing autobracket photographing, a reproduction device for reproducing images photographed by the digital still camera, and an image processor for performing image processing.

2. Description of the Prior Art

In silver-salt cameras, autobracket photographing is employed that performs photographing while altering an exposure amount. Conventionally, the following has been well known as this kind of image processor. First, Japanese Patent Laid-Open Publication No. 2001-218077 discloses that image processing is repeatedly carried out under different conditions in response to one input data, to generate image data.

This image processor permits the image processing under the different image processing conditions for one exposure data to generate a plurality of image data. The generated image data, however, are stored in individual image files, so that the image data cannot be distinguished from each other when reproducing.

Next, Japanese Patent Laid-Open Publication No. 2001-203934 discloses a digital camera that permits photographing under different conditions by only one operation to generate image data. This digital camera performs the photographing depending on the different conditions by the only operation to generate a plurality of image data.

The generated image data, however, are stored in individual image files, so that the image data cannot be distinguished from each other when reproducing. In this patent publication, the invention teaches autobracket photographing that is designed to perform photographing while altering photographic conditions other than the exposure amount.

Japanese Patent Laid-Open Publication No. 8-140025 discloses a digital camera that attaches information regarding image synthesis to a plurality of photographed images and which conduct the image synthesis utilizing the information. Although the information is attached to the plurality of photographed images, this information is used only to carry out the image synthesis.

Japanese Patent Laid-Open Publication No. 2000-59725 discloses a digital camera that records not only images but also information indicating that an entire image of a subject relates to a plurality of divided partial images stored in a minute manner. In this camera, data indicative of a relationship between the entire image of the subject and the plurality of images each partially photographed in a highly detailed manner is stored together with image data, thereby displaying the highly detailed data when displaying partial details.

A reproduction device for providing printouts and the like frequently performs automatic image correction that changes images to other images that are judged appropriate by the reproduction device itself. For example, when generating one set of photographed image data by performing image processing while altering contrasts utilizing autobracket photographing mode of the digital still camera, as a result the photographed image data in the one set slightly differ from each other in brightness.

However, when the reproduction device corrects the images into the other images judged right by the device upon reading and reproducing the one set of the photographed image data, although each data in the one set of the photographed image data has different brightness intentionally altered, the photographed image data may possibly be corrected and reproduced so as to show the same brightness.

Further, in the conventional arts, in cases where photographing is carried out in the autobracket photographing mode, the relationship between one image data and the other is not shown. The above-mentioned arts essentially have an object to provide the option to select the nearest image data to a photographed result as a photographer intends from among a plurality of image data after photographing. Thus, the relationship between the photographed image data in one set that are photographed in the autobracket photographing mode must be obviously shown.

Japanese Patent Laid-Open Publication No. 2001-218077 discloses that image data obtained by one time exposure is subjected to image processing under different processing conditions, thereby allowing a photographer to photograph images to meet his/her intention. However, in the art, if the same subject is continuously and repeatedly photographed in the similar condition or in the different condition, it is not understood which image data relates to the other. The above-mentioned art essentially has an object to provide a photographer with the option to select the nearest image data to a photographed result as he/she intends from among a plurality of image data after photographing. Thus, the relationship between the image data in one set photographed in the same mode must be obviously shown.

SUMMARY OF THE INVENTION

A first object of the present invention is to provide a digital still camera that allows a reproduction device to perform reproduction to reflect photographer's photographing intention, and to provide a reproduction device that permits reproduction to reflect the photographer's photographing intention.

A second object of the present invention is to provide a digital still camera and a reproduction device that facilitate selection of a result as most intended by a photographer from among the one set of the photographed image data obtained by autobracket photographing.

A third object of the present invention is to provide an image processor that facilitates selection of image data required by a photographer and which can recognize photographer's intention by adding data for identifying one set or pair of images generated in the same mode.

To achieve the first and second objects, according to the present invention there is provided a digital still camera comprising: optoelectronic transducing means for transducing light incident from an optical system into an electric signal; image storage means for storing the electric signal as image data; image processing means for performing predetermined image processing of the stored image data to output it as photographed image data; and data recording means for recording the photographed image data, wherein selection is allowed between an autobracket photographing mode in which one set of the photographed image data is recorded in response to one time photographing operation, and another photographing mode, each of the photographed image data in the one set having a different value of an image parameter which is adjustable by the image processing, and wherein, when recording the one set of the photographed image data, the data recording means renders the image data photographed in the autobracket photographing mode distinguishable, while linking the one set of the photographed image data as a series of image data to render the link distinguishable.

According to the present invention, there is provided a digital still camera comprising: optoelectronic transducing means for transducing light incident from an optical system into an electric signal; image storage means for storing the electric signal as image data; image processing means for performing predetermined image processing of the stored image data to output it as photographed image data; and data recording means for recording the photographed image data, wherein selection is allowed between an autobracket photographing mode in which one set of the photographed image data is recorded in response to one time photographing operation, and another photographing mode, each of the photographed image data in the one set having a different value of an image parameter which is adjustable by image correction, and wherein, when recording the one set of the photographed image data, the data recording means renders the image data photographed in the autobracket photographing mode distinguishable, while rendering the image parameter altered corresponding to each of the photographed image data in the one set distinguishable.

When recording the one set of the photographed image data, the data recording means renders the image parameter altered corresponding to each of the photographed image data in the one set distinguishable.

When recording the one set of the photographed image data, the data recording means stores identifying data indicating that the photographed image data is data photographed in the autobracket photographing mode, thereby permitting the distinguishing.

The data recording means further comprises file generating means for generating one set of image files each of which includes the corresponding data of the one set of the photographed image data, and file-name attaching means for attaching a file name indicating that the photographing is conducted in the autobracket photographing mode, to the corresponding file in the one set of the image files generated, thereby permitting the distinguishing.

On the other hand, according to the present invention there is provided a reproduction device comprising: first reading means for reading photographed image data stored in a recording medium; image reproducing means for reproducing the read photographed image data; characteristic detecting means for detecting a characteristic of the read photographed image data; and image correction means for performing image correction processing of the photographed image data based on the detected character, wherein first identifying means is further provided for determining whether or not the read photographed image data is data photographed in an autobracket photographing mode in which one set of the photographed image data is recorded in response to one time photographing operation, each of the photographed image data in the one set having a different value of an image parameter which is adjustable by the image processing, wherein, when the first identifying means makes a negative decision, the image correction means performs normal image correction processing, and wherein, when the first identifying means makes a decision that the image data is photographed in the autobracket photographing mode, the image correction means performs processing for autobracket photographing other than the normal image correction processing.

The reproduction device further comprises second identifying means for identifying the image parameter altered corresponding to each of the photographed image data in the one set when the read photographed image data is data photographed in the autobracket photographing mode, wherein the image correction means performs the processing for the autobracket photographing among the image correction processing other than the normal image correction processing in performing the image correction processing of the altered image parameter.

The reproduction device further comprises second reading means for reading the photographed image data and other photographed image data, all of which forms the one set of the photographed image data, when the read photographed image data is data photographed in the autobracket photographing mode, wherein the image correction means performs the image correction processing such that a difference in altered image parameter value is maintained when carrying out the image correction processing of the one set of the photographed image data read.

Further, according to the present invention, there is provided a reproduction device comprising: reading means for reading photographed image data stored in a recording medium; and image reproducing means for reproducing the read photographed image data, wherein first identifying means is further provided for determining whether or not the read photographed image data is data photographed in an autobracket photographing mode in which one set of the photographed image data is recorded in response to one time photographing operation, each of the photographed image data in the one set having a different value of an image parameter which is adjustable by the image processing, and wherein, when reproducing the photographed image data, the reproducing means performs the reproduction so as to render the data photographed in the autobracket photographing mode distinguishable.

The reproduction device further comprises second identifying means for identifying the image parameter altered corresponding to each of the photographed image data in the one set when the read photographed image data is data photographed in the autobracket photographing mode, wherein, when reproducing the photographed image data, the reproducing means performs the reproduction so as to render the altered image parameter distinguishable.

Also, according to the present invention, there is provided a reproduction device comprising; first reading means for reading photographed image data stored in a recording medium; and image reproducing means for reproducing the read photographed image data, wherein first identifying means is further provided for determining whether or not the read photographed image data is data photographed in an autobracket photographing mode in which one set of the photographed image data is recorded in response to one time photographing operation, each of the photographed image data in the one set having a different value of an image parameter which is adjustable by image processing, and second reading means is further provided for reading the photographed image data and other photographed image data, all of which forms the one set of the photographed image data, when the read photographed image data is data photographed in the autobracket photographing mode, and wherein the reproducing means reproduces in such a manner that the read photographed image data in the one set are disposed in parallel with each other on the same plane.

In this configuration, when the digital still camera attaches a file name that identifies the autobracket photographing mode to an image file including the photographed image data, the first identifying means reads out the file name, while performing the identification based on the read file name.

When the digital still camera stores identifying data for identifying the photographed image data that is photographed in the autobracket photographing mode, the first identifying means reads out the identifying data, while performing the identification based on the read identifying data.

To achieve the above-mentioned third object, according to the present invention, there is provided an image processor comprising: an yet-to-be-processed image storage section for keeping input data inputted from an image input section; an image processing block for performing predetermined image processing of the input data; a processed image storage section for keeping a processed result; and a data storage section for storing the processed data, wherein the input data is subjected to the image processing under a plurality of different conditions, and wherein generated image data and data for identifying the image photographed in the same mode as the generated data are stored together in the data storage section.

In this case, the identifying data is different depending on the condition altered when performing the image processing.

Further, according to the present invention, there is provided a reproduction device comprising: a data reading section operable to read image data stored in a medium and identifying data for identifying a plurality of image data generated by altering a processing condition; an image reproducing section for reproducing the image data; an image characteristic detector for detecting a character of an reproduced image; and an image correcting section for correcting the image based on a detected result, wherein an image correction other than the normal image correction is performed for the altered processing condition.

According to the present invention, there is provided an image processor comprising: a data reading section operable to read image data stored in a medium and identifying data whose processing condition is altered; an image reproducing section for reproducing the image data; an image characteristic detector for detecting a character of an reproduced image; and an image correcting section for correcting the image based on a detected result, wherein, when reading the identifying data, information on a plurality of the image generated in the same mode is read, and the image correction is performed such that a difference in effect between the altered image processing conditions is maintained.

According to the present invention, there is provided an image processor comprising: a data reading section operable to read image data stored in a medium and identifying data whose processing condition is altered; an image reproducing section for reproducing the image data; and a display device for displaying the image data reproduced, wherein, when the identifying data is read, data (characters or signs) for identifying at least one of an image generated by altering an image processing condition and the altered condition is simultaneously displayed on the display device.

According to the present invention, there is provided an image processor comprising: a data reading section operable to read image data stored in a medium and identifying data whose processing condition is altered; an image reproducing section for reproducing the image data; and a display device for displaying the image data reproduced, wherein, when the identifying data is read, a plurality of the image data generated in the same mode is read to be displayed in parallel with each other on the same screen.

According to the present invention, there is provided an image processor comprising: an yet-to-be-processed image storage section for keeping input data inputted from an image input section; an image processing block for performing predetermined image processing of the input data; a processed image storage section for keeping a processed result; and a data storage section for storing the processed data, wherein the input data is subjected to the image processing under a plurality of different conditions, and wherein an image file name corresponding to one set of the generated image data is stored in the data storage section as a file name distinguishable from another image processing result.

In the above-mentioned configuration, one part of the file name is changed according to the altered condition when performing the image processing.

According to the present invention, there is provided an image processor comprising: a data reading section operable to read image data stored in a medium and a file name of the image data; a file-name determining section for recognizing that the file name is among a plurality of files generated by altering an image processing condition; an image reproducing section for reproducing the image data; an image characteristic detector for detecting a character of an reproduced image; and an image correcting section for correcting the image based on a detected result, wherein an image correction other than the normal image correction is performed for the altered processing condition.

According to the present invention, there is provided an image processor comprising: a data reading section operable to read image data stored in a medium and a file name of the image data; a file-name determining section for recognizing that the file name is among a plurality of files generated by altering an image processing condition; an image reproducing section for reproducing the image data; an image characteristic detector for detecting a character of an reproduced image; and an image correcting section for correcting the image based on a detected result, wherein, in cases where the file-name determining section recognizes that the read file is one generated by altering the processing condition, another image file with the file name indicating that the another image file is generated in the same mode is also read out, and an image correction is performed such that a difference in effect between the altered image processing conditions is maintained.

According to the present invention, there is provided an image processor comprising: a data reading section operable to read image data stored in a medium and a file name of the image data; a file-name determining section for recognizing that the file name is among a plurality of files generated by altering an image processing condition; an image reproducing section for reproducing the image data; and a display device for displaying the reproduced image data, wherein, in cases where the file-name determining section recognizes that the read file is one generated by altering the processing condition, data (characters or signs) for identifying at least one of an image generated by altering the image processing condition and the altered condition is simultaneously displayed on the display device.

According to the present invention, there is provided an image processor comprising: a data reading section operable to read image data stored in a medium and a file name of the image data; a file-name determining section for recognizing that the file name is among a plurality of files generated by altering an image processing condition; an image reproducing section for reproducing the image data; and a display device for displaying the reproduced image data, wherein, in cases where the file-name determining section recognizes that the read file is one generated by altering the processing condition, another image data generated in the same mode is also read out to be displayed in parallel on the same plane.

BRIEF DESCRIPTION OF THE DRAWINGS

FIG. 2 is a diagram showing an example of an image file stored in a memory card.

DETAILED DESCRIPTION OF THE PREFERRED EMBODIMENTS

Hereinafter, some embodiments of the present invention will be described in detail with reference to the accompanying drawings.

It should be noted that although a digital still camera photographing system using an image processor as a photographing module thereof will be explained below, the present invention is not limited thereto and may embody an image processing system that performs image processing of data stored in a memory of a personal computer.

Figure 1:
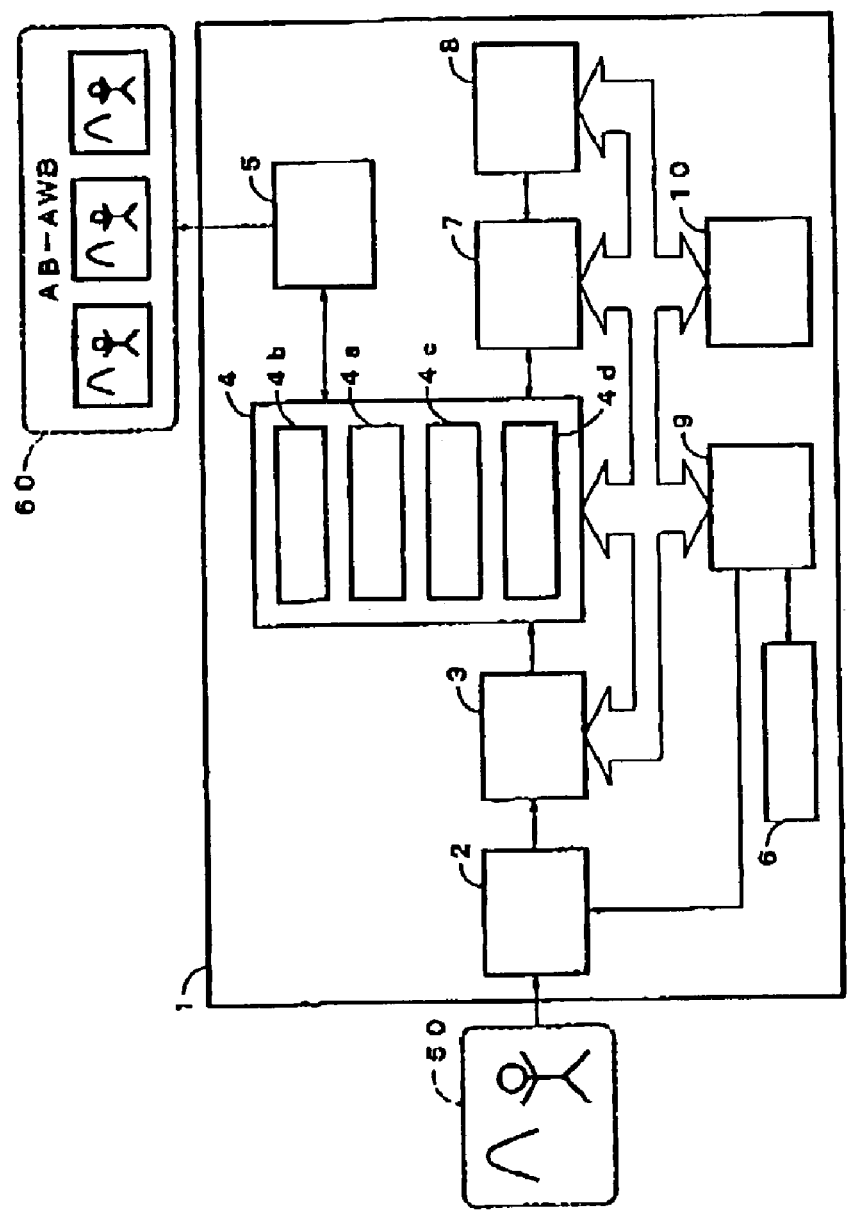
FIG. 1 is a block diagram showing one preferred embodiment of a digital still camera, which includes a digital still camera, a reproduction device, and an image processor in accordance with the present invention.

Referring now to FIG. 1, the digital still camera includes an input device 2 for transducing light of a subject 50 incident from an optical system into a camera body 1, into an electric signal, a frame memory 3 (namely, image storage means) for temporarily storing the electric signal as image data, an image processor 4 (namely, image processing means) for performing image processing of the image data stored in the frame memory 3, and a display device 5 for displaying the image data subjected to the image processing.

The digital still camera further includes a key operating section 6 for performing various operations including photographing operation of giving a command to photograph, a buffer memory 7 for temporarily storing the image data subjected to the image processing, a memory card 8 for recording the image data stored in the buffer memory as photographed image data in response to the photographing operation, a controller or microcomputer 9 for controlling the operation of each component and each device, and a print outputting section or print outputting device 10 (namely, image reproducing means) for providing printouts of the photographed image data stored in the memory card 8 and for reproducing them.

It should be noted that although the print outputting device 10 incorporated in the digital camera will be explained in the present preferred embodiment, the present invention is not limited thereto, and a digital camera and the print outputting device 10 may be individually disposed.

The input device 2 includes, for example, an optical lens unit (namely, the optical system) not shown, a photographing element (namely, CCD: charge coupled element) for receiving light from the subject and outputting an analog electric signal, a control signal generator (namely, TSG: a timing signal generator) for driving the CCD (that is, optoelectronic transducing means), an analog (A)/digital (D) converter for converting analog image data outputted from the CCD into the digital image data, and the like.

The frame memory 3 temporarily keeps the digital image data inputted from the input device 2.

The image processor 4 includes an image processing section 4a for adjusting a gain of white balance, an edge emphasis coefficient, a gamma conversion coefficient, and the like. A color conversion coefficient is one to adjust the hue of the image data, the edge emphasis coefficient to adjust the outline (edge) of the image data, and the gamma conversion coefficient to adjust the brightness of the image data.

The image processor 4 further includes a display controller 4b for performing control in displaying on the display device 5 the image data subjected to the image processing by the image processing section 4a, a data compression section 4c for performing data compression processing of the image data so as to decrease storage capacities for use in storing the image data in the memory card 8, and a data decompression section 4d for performing data decompression processing of the image data so as to increase the storage capacities for use in storing the image data in the memory card 8.

The image processor 4 processes the data temporarily kept in the frame memory 3 based on image processing parameters set from the controller 9, to output the processed data to the buffer memory 7.

The display controller 4b transmits the data written in the buffer memory 7 to the display device 5 to display the photographed images. The data compression section 4c compresses the data written in the buffer memory 7 to output the processed result to a storage section such as the memory card 8 or the like.

Further, the above-mentioned image processing section 4a converts the image data comprising three colors of R, G, and B outputted from the input device 2 into data having brightness Y and color-difference Cb and Cr. The microcomputer 9 comprises a central processing unit (CPU) not shown, a read-only memory (ROM), a random-access memory (RAM), and the like.

The controller 9 comprises microcomputers such as a CPU, a ROM, a RAM not shown and the like. This CPU utilizes the RAM as a work area in compliance with programs stored in the ROM and controls the entire operation of the above digital still camera 1, following an instruction from the key operating section 6, an instruction of an operation from an outside source such as a remote controller not shown, or an instruction of a communication operation of an external terminal such as a personal computer and the like. Concretely, the controller 9 performs photographing-operation control processing, setting of image processing parameters in the image processor, memory control processing, and display control processing.

The key operating section 6 is used to give an operation instruction to the digital still camera 1 and includes a release key for providing an instruction to photograph, and a button for performing various settings from the external sources.

Now, the general operation of the camera having the above-mentioned configuration will be described below.

When a power source switch is turned on, the microcomputer 9 opens a shutter not shown and forms an image of a subject on the CCD in the input device 2 via a lens. The CCD transduces the subject image into an electric signal to output it as analog image data comprising three colors of R, G, and B. This analog image data is converted into a digital image signal by the A/D converter. The converted digital image data is kept in the frame memory 3.

Next, the microcomputer 9 reads a specific part of the digital image data kept in the frame memory 3 or the entire values of the R, G, and B and calculates gains Gr0 and Gb0 of the white balance so as to apply appropriate colors to the images.

The image processing section 4a converts the image data comprising the three colors R, G, and B into image data comprising the brightness Y, and the color-difference Cb and Cr, to output it to the buffer memory 7. When performing the image conversion, the image processing section 4a carries out adjustment of the white balance of the image data utilizing the white balance gains Gr0 and Gb0 calculated by the microcomputer 9. The image data stored in the buffer memory 7 after the adjustment of the white balance is transmitted to the display device 5 via the image processor 4 to be displayed. The above-mentioned operation is repeatedly performed at predetermined intervals (for example, every $1/30$ sec.).

Now, autobracket (AB) photographing will be described below. The AB photographing is photographing operation in which one set of the photographed image data is recorded in the memory card 8 in response to one time photographing operation, each of the photographed image data having different value of an image parameter, such as hue, outline, brightness, or the like.

In the embodiment, for example, the image processing is performed by changing the white balance gain in the AB photographing, thereby obtaining one set of photographed image data each data having different color or hue. Also, the image processing is performed by changing the edge emphasis coefficient, thereby obtaining one set of photographed image data each data having a different outline. Further, the image processing is performed by changing the gamma conversion coefficient, or by photographing while changing an exposure amount, thereby obtaining one set of photographed image data each data having a different brightness of the subject.

Now, the photographing operation of the digital still camera when selecting the AB photographing mode in which one set of three pieces of photographed image data with different hue is recorded in response to one time photographing operation will be explained below.

When the photographing operation is performed by the key operating section 6, the above-mentioned adjustment of the white balance is carried out, and the image data stored in the buffer memory 7 is read into the data compression section 4c of the image processor 4, thereby compressing this image data by JPEG compression, for example. Next, the microcomputer 9 functions as data recording means and file generating means to generate an image file including the above compressed image data as first photographed image data, so that the generated file is recorded in the memory card 8 which serves as an external recording device.

Next, the microcomputer 9 makes the image processor 4 perform image processing at next timing, utilizing white balance gains Gr1 and Gb1 (Gr1<Gr0, Gb1>Gb0) such that the image data stored in the frame memory 3 has its hue or color rendered bluish, to compress it. After compression, an image file including the compressed image data is generated as second photographed image data to record it in the memory card 8.

Then, the microcomputer 9 makes the image processor 4 perform image processing at next timing, utilizing white balance gains Gr2 and Gb2 (Gr2>Gr0, Gb2<Gb0) such that the image data stored in the frame memory 3 has its hue or color rendered reddish, to compress it. After compression, an image file including the compressed image data is generated as third photographed image data to record it in the memory card 8. By the above-mentioned operation, one set of three pieces of photographed image data having different hue is recorded in the memory card 8.

The microcomputer 9, when recording the image files including the one set of three pieces of photographed image data with different hue in the memory card 8, renders the one set of the photographed image data photographed in the AB photographing mode distinguishable, while linking the photographed image data in the one set with each other as a series of image data, thereby to render the link distinguishable. In addition, the microcomputer 9 renders the image parameter altered corresponding to each of the photographed image data in the one set distinguishable.

The method of rendering the AB photographing mode, the link, and the altered image parameters distinguishable will be explained below. For example, identifying data indicative of the AB photographing mode, linking data that makes the link distinguishable, or parameter data that makes the image parameter distinguishable, is stored in each of the image files including the one set of photographed image data. How to store the linking data in each of the above-mentioned image files may be to write a file name relating to three pieces of photographed image data as the linking data in each of the image files. Further, depending on the type of the image parameters altered, the identifying data may be altered so that the identifying data also serves as a parameter data function.

It should be noted that although the identifying data, the linking data, and the parameter data are stored in each of the image files, the invention is not limited thereto and these identifying data, the linking data, and the parameter data may be written in a file other than the image files. As mentioned above, by storing the identifying data, the linking data and the parameter data, the AB photographing mode, the link, and the altered image parameter can be identified with case.

Moreover, the method of rendering the AB photographing mode, the link, and the altered image parameter distinguishable may comprising the steps of operating the microcomputer 9 as file-name attaching means and attaching file names for identification to the image files generated.

The attachment of these file names will be explained hereinafter with reference to FIG. 2.

FIG. 2 shows a file name to be recorded in the memory card 8 on the following situation. First, normal photographing is repeatedly performed twice. Then AB photographing is repeatedly performed twice. In one time AB photographing operation, image processing having a different white balance gain altered is repeatedly carried out in response to one time photographing operation, thereby to record one set of three pieces of the photographed image data having different hue. Subsequently, other AB photographing is performed once. In this AB photographing, image processing having. a different edge emphasis coefficient altered is repeatedly carried out in response to one time photographing operation, thereby to record one set of three pieces of the photographed image data having different outlines. Finally, the normal photographing is successively performed once.

In the figure, the file name of the photographed image data normally photographed has four characters "RIMG" at the font. For the AB photographing performed by altering the white balance gain to change the hue, the file name of each of the photographed image data has a character "W" at the front. On the other hand, for the AB photographing performed by altering the edge emphasis coefficient to change the outline, the file name of each of the photographed image data has a character "S" at the front. Thus, by attaching to the file name the data indicative of the image parameter whose value is altered depending on the AB photographing condition, the fact that the photographing is performed in the AB photographing mode and the AB photographing mode itself, which are known from the file name, allows the image parameter having its value altered to be identified.

When performing the first AB photographing, the file name has the second and third characters "01", while for the second AB photographing the file name has the second and third characters "02". Thus, attaching different data to each set of the photographed image data photographed in the AB photographing, enables identification of the relationship between the sets of the photographed image data.

The file name has the fourth character indicating where the file is located among the photographed image data in the one set photographed in the AB photographing. That is, if the fourth character is "1", it is found that the file has been first generated. If the fourth character is "2", it is found that the file has been secondly generated. If the fourth character is "3", it is found that the file has been thirdly generated.

As explained above, by attaching the file name distinguishably indicating the AB photographing mode, the link, and the altered image parameter to the image file, a look at the file name enables easy identification of various matters.

Now, the reproducing operation of the digital camera shown in FIG. 1 will be explained below.

First, in starting up reproducing operation, the microcomputer 9 functions as first reading means and reads photographed image data recorded in the memory card 8 into the buffer memory 7 once. Next the microcomputer 9 controls the data decompression section 4d in the image processor 4 to decompress the photographed image data read and then writes the decompressed data back into the buffer memory 7. The photographed image data written back into the buffer memory 7 is read by the display controller 4b to be displayed on the display device 5, and then to be reproduced.

When reproducing the image data displayed on the display device 5, the microcomputer 9 functions as first identifying means to determine whether the photographed image data read is data photographed in the AB photographing mode or not. If it is photographed in the AB photographing mode, the microcomputer 9 then functions as second reading means to search for and read the read photographed image data and other photographed image data, all of which comprise one set of three pieces of the photographed image data, based on the linking data stored in the memory card 8 and the image file names. Further, the microcomputer 9 functions as second identifying means to identify the image parameter whose value is altered for each data in the one set of the photographed image data read.

Next, the microcomputer 9 controls the display controller 4b to display the one set of the photographed image data with each data in parallel, while distinguishably displaying the photographing in the AB photographing mode and the altered image parameter. For example, when altering the hue or color as the image parameter by changing the white balance gain, as shown in reference numeral 60 of FIG. 1, characters such as "AB-AWB" are displayed.

As mentioned above, the display of one set of the photographed image data with each data in parallel, which are photographed in the AB photographing mode, enables recognizing the effects of the autobracket photographing, thereby easily comparing the photographed image data to determine which photographed image data is necessary. Also, the distinguishable display of the AB photographing and the image parameter altered in the AB photographing enables a photographer to understand that the photographed image data is one recorded in the autobracket photographing mode. Accordingly, even if the similar type of the photographed image data is continuously reproduced, there is no risk of canceling the data by mistake.

Figure 3:
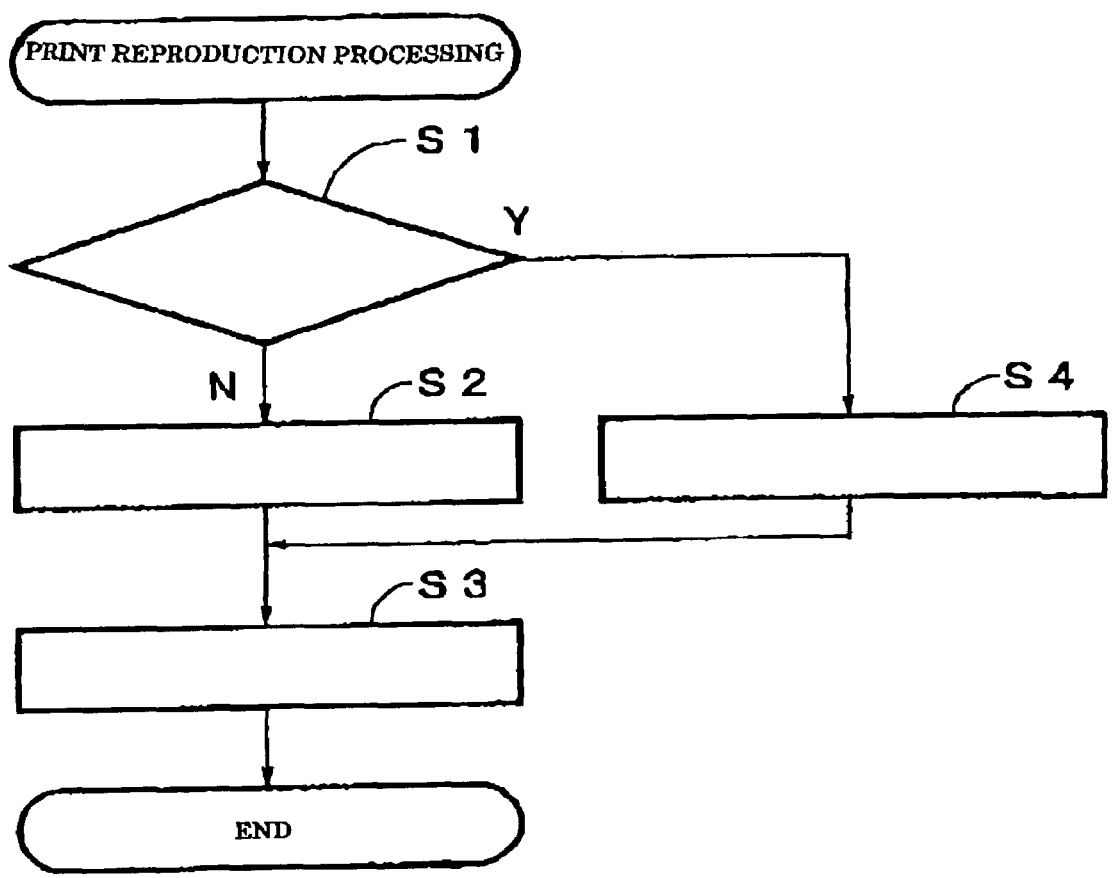
FIG. 3 is a flowchart showing a procedure of reproduction processing performed by a microcomputer.

When print reproducing actuation is performed, the microcomputer 9 conducts print reproduction processing. This print reproduction processing will be described hereinafter referring to processing steps of the microcomputer 9 as shown in FIG. 3.

First, the microcomputer 9 functions as first reading means and first identifying means to determine whether the photographed image data that is required to be reproduced and printed out is one photographed in the AB photographing mode or not (step S1). This determination is carried out by reading the identifying data stored in the memory card 8, and the image file names, for example.

If the photographed image data is not photographed in the AB photographing mode (N in step S1), the microcomputer 9 controls the image processing section 4a to detect characteristics of the photographed image data that is required to be reproduced and printed out. Based on the characteristics detected, the microcomputer 9 performs normal image correction processing (step S2). After the normal correction processing, the photographed image data is sent to the print outputting device 10, thereby providing a printout (step S3). As seen from the above explanation, the image processing section 4a serves as image correction means and characteristic detecting means.

On the other hand, if the photographed image data is photographed in the AB photographing mode (Y in step S1), the microcomputer 9 controls the image processing section 4a to detect characteristics of the photographed image data that is required to be reproduced and printed out. Based on the characteristics detected, the microcomputer 9 performs image correction processing for AB photographing other than the normal image correction processing of the image processing (step S4). Thereafter the operation proceeds to the step S3.

The concrete operation of the image correction processing for the above-mentioned AB photographing will be described hereinafter.

First, the microcomputer 9 functions as second identifying means to identify the image parameter altered for each data in one set of the photographed image data, which includes the photographed image data to be required for being reproduced and printed out, based on the parameter data and the image file names stored in the memory card 8.

In cases where, as a result of performing the image processing while changing the white balance gain for example, the hue or color turns out to be altered as the image parameter through the above identification, the microcomputer 9 controls the image processor 4 not to perform white balance processing of correcting the hue or color among the image correction processing. Otherwise, the microcomputer 9 may control the image processor 4 such that a correction amount of the white balance is smaller than that of the normal correction processing.

Similarly, when the outline and brightness is altered as the image parameters, the image processor does not perform image correction processing of correcting the outline and that of correcting the brightness alone among the image correction processing, or makes a correction amount of the outline and brightness smaller than that of the other normal processing.

When each of the image data photographed by the AB photographing is subjected to the above-mentioned image correction processing for the AB photographing, in one set of the photographed image data each of which has its hue, outline, or brightness altered, there is not provided the image correction processing so as to eliminate a difference in the hue, outline, or brightness between the image data. That is, the difference in value of the image parameter that has been altered as intended by the photographer is not eliminated by the image correction processing, thereby printing out the photographed image data to reflect the photographer's intention.

Now, the operation of image correction processing for AB photographing according to another embodiment will be described hereinafter.

First, the microcomputer 9 functions as second reading means to search for and read the photographed image data which is required for being printed and reproduced and the other photographed image data, all of which form one set of three pieces of the photographed image data, based on the linking data and the image file names stored in the memory card 8. And a difference in value of the image parameter altered between the photographed image data in each set of three, which has been read, is extracted.

The method of extracting the above-mentioned image parameter difference in value is suggested as follows. For example, in the case of storing one set of photographed image data obtained by the AB photographing in the memory card 8, if data indicative of altered values of the image parameter are previously stored, or if file names indicative of the image parameter values are attached, the data or the file name may be read out and extracted.

On the contrary, if the data are not previously stored, or if the file names indicative of the image parameter values are not attached, the image processing section 4a may extract the image parameter difference in value based on the characteristic obtained by the detection of each data from among the one set of the photographed image data. Thereafter, the microcomputer 9 controls the image processing section 4a to perform the image correction processing of the one set of the photographed image data such that the extracted image parameter difference in value is maintained.

As mentioned above, when performing the image correction processing of the read set of the photographed image data, this image correction processing is performed so as to maintain or keep the image parameter difference in value. Accordingly, the image correction is performed without eliminating the image parameter difference value intentionally altered by the photographer, thereby printing out the photographed image data to reflect the photographing intention of the photographer.

It should be noted that in the above-mentioned embodiment, when the digital still camera records in the memory card 8 the one set of the photographed image data obtained by photographing one time in the AB photographing mode, there are distinguishably displayed or provided three points, that is, the photographing performed in the AB photographing mode, the relationship between the photographed image data in the one set, and the image parameter whose value is altered for each data of the one set of the photographed image data. However, when there is no need to display one set of photographed image data with each data in parallel, and the former one of the above-mentioned two ways of image correction processing is employed, the microcomputer 9 does not have to identify the link, but have only to distinguishably show the photographing in the AB photographing mode and the image parameter whose value is altered for each data in the one set of the photographed image data.

Further, when performing the latter one of the two ways of image correction processing, the digital still camera has only to extract the image parameter whose value is altered utilizing the image processor 4 and the difference of the image parameter in value, thereby distinguishably showing the photographing in the AB photographing mode and the link without identification of the altered image parameter.

Further, in the present embodiment, the memory card 8 is employed as a recording medium, but a built-in memory of the digital still camera may be employed.

Although the reproduction device is built in the digital still camera, the present invention is not limited thereto and a reproduction device may be disposed apart from the digital still camera. In this case, when the reproduction device reads the data, the following three forms may be supposed. The first form is that the digital still camera reads the data from the memory card 8. The second form is that the reproduction device reads the data from the digital still camera via a wired or wireless connection. The third form is that the data is read from the memory card 8 by means of a card drive of the reproduction device.

Now, as an example of generating three images while changing an image processing condition, the operation of performing image processing while altering a gain of the white balance will be described hereinafter.

First, the basic operation of AWB control will be explained in brief.

An image of a subject is incident on the CCD (input device 1) via the lens. The CCD transduces or converts the subject image into an electric signal (analog image data) to output analog image data of R, G, and B. This analog image data is converted into digital image data of R, G, and B by the A/D converter. The digital image data converted is kept in the frame memory 3.

The microcomputer of the controller 9 reads a specific part of this digital image data or the entire values of R, G, and B, to calculate gains Gr0 and Gb0 of the white balance so as to obtain the appropriate white balance.

The image processing section 4a converts the R, G, and B data into data with the brightness Y and the color-difference Cb and Cr, to output it to the buffer memory 7. When performing this image conversion, the controller 12 sets the white balance gains Gr0 and Gb0 to the image processing section 4.

The data stored in the buffer memory 7 is read into the data compression section 4c of the image processor to be compressed by the JPEG compression, for example. The compressed data is recorded in an external recording device such as the memory card 8.

When using the parameter that alters the white balance, gains Gr1 and Gb1 (Gr1<Gr0, Gb1>Gb0) that makes an image bluish in a second image processing are set, and then the image processing is carried out. After compression, the data is recorded in the memory card 8. In a third image processing, gains Gr2 and Gb2 (Gr2>Gr0, Gb2<Gb0) that makes an image reddish are set and recorded.

When reproducing, a compression image data file stored in the memory card 8 is once read into the buffer memory 7. This data is decompressed by the data decompression section 4d in the image processing block 4, and then the decompressed data outputted from the data decompression section 4d is written back into the buffer memory 7.

The reproduced image is read by the display controller 4b in the image processing block 4 to be displayed on the display device 5.

In cases where the requirement for print is inputted by the key operating section 6, the feature of the image is detected by the image processor 4 to be subjected to image correction processing suitable for the print. After the image correction processing, the image is transferred to the print outputting section 10, thereby being printed out. It should be noted that although the reproduction device for printing out is built in the digital still camera in the example, a reproduction device and a digital still camera may be separated from each other.

The present invention will have the following effects with the above-mentioned configuration.

1. In cases where the reproduction device is capable of identifying the AB photographing mode and the link between the image data, for example, one set of the photographed image data is able to be reproduced by performing correction such that the difference of the image parameter in value between the photographed image data is maintained. Thus, the reproduction device can reproduce so as to reflect the photographer's intention. Further, since the link is rendered distinguishable, one set of the photographed image data is able to be disposed, for example, on a display in the reproduction device and the digital still camera with the image data in parallel so as to be reproduced. This provides the digital still camera that facilitates selection of a result as the photographer most desires from among one set of the photographed image data obtained by the autobracket photographing.

2. In cases where the reproduction device is capable of identifying the AB photographing mode and the altered image parameter, for example, only correction of the image parameter altered is performed by image correction processing other than the normal image correction processing so that the correction is carried out while keeping the difference of the image parameter in value between the photographed image data in the one set, leading to the reproduction. This provides the digital camera that allows the reproducing device to reproduce to reflect the photographer's intention.

3. In cases where the reproduction device is capable of identifying the AB photographing mode and the altered image parameter, for example, only correction of the image parameter altered for each data in one set of the photographed image data is performed by image correction processing other than the normal image correction processing so that the correction is carried out while keeping the difference of the image parameter in value between the photographed image data in the one set, leading to the reproduction. This provides the digital camera that allows the reproducing device to reproduce to reflect the photographer's intention.

4. The digital still camera is provided that can render the photographed image data distinguishable by storing the identifying data and by discriminating the photographed image data photographed in the AB photographing mode.

5. By attaching a file name indicative of the photographing in the AB photographing mode, a look at the file name allows the reproduction device to recognize that the photographing is performed in the AB photographing mode, thereby providing the digital still camera that permits the reproduction to reflect the photographer's intention.

6. The photographed image data photographed in the AB photographing mode are subjected to the processing for the AB photographing different from the normal image correction processing. Thus, the image correction is carried out such that the image parameter difference in value as the photographer intentionally alters is not eliminated, thereby providing the reproduction device that permits the reproduction to reflect the photographer's intention.

7. The only image correction processing of the image parameter altered is performed by the image correction processing for the AB photographing different from the normal image correction processing, leading to the image correction that does not eliminate the image parameter difference in value as intentionally altered by the photographer. Additionally, the image correction processing of image parameters except for the altered parameter can be performed by the normal image correction, thereby providing the reproduction device that permits the reproduction to reflect the photographer's intention.

8. When performing image correction processing of one set of the photographed image data read, the correction processing is performed such that the difference in image parameter value is kept. Accordingly, the correction processing is available so that the difference in the image parameter value as intentionally altered by the photographer is not eliminated, thereby providing the reproduction device that permits the reproduction to reflect the photographer's intention.

9. Since the photographer recognizes that the photographed image data is one recorded in the AB photographing mode, even if the similar photographed image data are continuously reproduced, they are prevented from being cancelled by mistake. And this provides the reproduction device that facilitates comparison of the photographed image data.

10. The photographer can identify the image parameter whose value is altered by the AB photographing. And this provides the reproduction device that facilitates comparison of the respective data in one set of the photographed image data.

11. The one set of the photographed image data is disposed with each data in parallel on the same plane to be reproduced, thereby allowing the photographer to recognize the effects of the photographing in the AB photographing mode. This provides the reproduction device that facilitates comparison to determine which photographed image data is necessary.

12. The reproduction device is provided that enables identification of the AB photographing mode with case at a glance of the file name.

13. The reproduction device is provided that enables identification of the AB photographing mode with ease only by reading the identifying data.

14. By adding data that identifies one set of the image data generated under a plurality of processing conditions from the same input, the photographer can easily select the most intended image data from the result. If the reproduction device is capable of identifying this data, the photographer's intention is transmitted to the reproduction device.

15. By reading the identifying data, the intention to generate the images is identified, thereby preventing the image processing from eliminating the condition intentionally altered.

16. By reading the identifying data, the intention to generate the images is identified, thereby performing image correction in compliance with the condition intentionally altered.

17. One set of the images recorded in the same mode is identified, thereby avoiding cancellation of the image by mistake, facilitating comparison between the images.

18. One set of the images recorded in the same mode is displayed with each image in parallel, thereby confirming an image processing result, facilitating comparing between the image data to determine which image data is necessary data.

19. Since one set of image files generated under a plurality of processing conditions from the same input is identified by a file name, the photographer can easily select the most intended image data from the result. If the reproduction device is capable of identifying this file name, the photographer's intention is transmitted to the reproduction device.

20. A look at the file name allows the photographer to identify the one set of files, regarding whose condition is altered so as to perform the image processing.

21. By identifying the altered image processing condition from the file name, the intention to generate the images is identified, thereby preventing the image processing from eliminating the condition intentionally altered.

22. By reading the identifying data, the intention to generate the images is identified, thereby performing image correction in compliance with the condition intentionally altered.

23. One set of the images recorded in the same mode is identified, thereby avoiding cancellation of the image by mistake, facilitating comparison between the images.

24. One set of the images recorded in the same mode is displayed with each image in parallel, thereby confirming an image processing result, facilitating comparing between the image data to determine which image data is necessary data.

Although the present invention has been explained based on various embodiments in the above description, it is not limited to the above-mentioned embodiments, and various modifications and applications may be employed within the scope of the present invention.

What is claimed is:

1. A still camera, comprising:
   an optoelectronic transducing device configured to transduce light incident from an optical system into an electric signal;
   an image storage device configured to store said electric signal as image data;
   an image processing device configured to perform predetermined image processing of said stored image data to output it as photographed image data; and
   a data recording device configured to record said photographed image data,
   wherein the still camera is capable of achieving an autobracket photograph in which one set of the photographed image data is recorded in response to one time photographing operation, each of the photographed image data in the one set having a different value of an image parameter which is adjustable by the image processing, the still camera including a file name attaching device configured to automatically attach a distinct file name showing that the one set of the photographed image data is made by autobracket photography and an image parameter changed in the autobracket photography, wherein each set has a different file name.

2. The still camera according to claim 1,
   wherein the file name attaching device is configured to further attach a file name capable of distinguishing a number of times preparing the one set of photographed image data.

3. The still camera according to claim 1, wherein the image parameter changed in the autobracket photography is white balance gain.

4. The still camera according to claim 1, wherein the image parameter changed in the autobracket photography is edge emphasis coefficient.

5. The still camera according to claim 1, wherein the second and third characters in the file name indicate the number of times the one set of photographed image data has been prepared.

6. The still camera according to claim 1, wherein first characters of the file name indicate the image parameter changed in the autobracket photography.

7. The still camera according to claim 1, wherein the image processing is performed by changing a gamma conversion coefficient.

* * * * *